United States Patent
Degawa (10) Patent No.: US 8,976,047 B2
(45) Date of Patent: Mar. 10, 2015

(54) ELECTRONIC APPARATUS THAT DETECTS DIFFERENT KINDS OF OPERATIONS ON ROTATIONAL OPERATION MEMBER

(75) Inventor: Takamasa Degawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 662 days.

(21) Appl. No.: 13/310,234

(22) Filed: Dec. 2, 2011

(65) Prior Publication Data

US 2012/0146818 A1     Jun. 14, 2012

(30) Foreign Application Priority Data

Dec. 10, 2010   (JP) ................................ 2010-275772

(51) Int. Cl.

| | | |
|---|---|---|
| H03K 17/94 | (2006.01) | |
| G08B 21/00 | (2006.01) | |
| G03B 17/00 | (2006.01) | |
| G03B 17/02 | (2006.01) | |
| G03B 17/18 | (2006.01) | |
| G06F 3/0362 | (2013.01) | |
| H01H 25/06 | (2006.01) | |

(52) U.S. Cl.
CPC .............. *G03B 17/02* (2013.01); *G03B 17/18* (2013.01); *G06F 3/0362* (2013.01); *H01H 25/065* (2013.01); *H01H 2239/006* (2013.01)
USPC .... 341/35; 340/686.1; 340/636.3; 340/686.4; 340/686.5; 396/435; 396/436

(58) Field of Classification Search
None
See application file for complete search history.

(56) References Cited

U.S. PATENT DOCUMENTS

| | | | |
|---|---|---|---|
| 5,005,033 A | 4/1991 | Miyasaka | |
| 6,067,424 A | 5/2000 | Shono | |
| 7,024,947 B2 * | 4/2006 | Ishiguro et al. | ......... 73/862.451 |
| 8,125,446 B2 * | 2/2012 | Aramaki | ...................... 345/157 |

(Continued)

FOREIGN PATENT DOCUMENTS

| | | |
|---|---|---|
| JP | 2004-327218 A | 11/2004 |
| JP | 2006-119519 | 5/2006 |
| JP | 2007-171669 A | 7/2007 |

(Continued)

OTHER PUBLICATIONS

A Dec. 23, 2013 Chinese Office Action, that issued in Chinese Patent Application No. 201110415585.X.

(Continued)

*Primary Examiner* — Julie Lieu
(74) *Attorney, Agent, or Firm* — Cowan, Liebowitz & Latman, P.C.

(57) ABSTRACT

A mechanism enabling an electronic dial to operate without generating a click noise. The dial includes a rotational operation member that is turnable. A rotary plate is rigidly secured to the operation member. The rotary plate is formed of a conductive material and has a plurality of detecting portions circumferentially formed thereon. A printed circuit board is disposed between the operation member and the rotary plate. The printed circuit board has a first detection electrode group formed on a surface thereof opposed to the operation member and a second detection electrode group formed on a surface thereof opposed to the rotary plate. A detection circuit detects a touch operation onto the operation member based on an output from the first detection electrode group and detects a turning operation of the operation member based on an output from the second detection electrode group.

12 Claims, 7 Drawing Sheets

(56) References Cited

U.S. PATENT DOCUMENTS 8,436,817 B2* 5/2013 Oh ............................... 345/173
2010/0200384 A1 8/2010 Tsuduki

FOREIGN PATENT DOCUMENTS

| JP | 2008-078045 A | 4/2008 |
|---|---|---|
| KR | 10-2010-0005733 A | 1/2010 |

OTHER PUBLICATIONS

A Annex to the European Search Report issued on Apr. 20, 2012, that issued in the corresponding European Patent Application No. 11191992.4.
A Jan. 2, 2014 Korean Office Action, that issued in Korean Patent Application No. 10-011-0131482.

* cited by examiner

ELECTRONIC APPARATUS THAT DETECTS DIFFERENT KINDS OF OPERATIONS ON ROTATIONAL OPERATION MEMBER

BACKGROUND OF THE INVENTION

1. Field of the Invention

The present invention relates to an electronic apparatus, such as a digital camera, and more particularly to an electronic apparatus provided with a rotational operation member, such as an electronic dial.

2. Description of the Related Art

There has been proposed an electronic apparatus, such as a digital camera, which is provided with an electronic dial as a rotational operation member for changing settings associated with a shutter speed, a diaphragm value, an ISO sensitivity, etc. (see Japanese Patent Laid-Open Publication No. 2006-119519). The electronic dial comprises a rotary dial part which can be operated to rotate and a dial base that rotates in unison with the dial part. The electronic dial has a contact piece held in contact with the dial base, and when the dial part is turned, the contact piece is brought into contact with an electrode formed on the dial base, whereby the turning operation of the dial part is detected. Further, the electronic dial is provided with a click mechanism which gives a click feeling to a user when the user turns the dial part.

In Japanese Patent Laid-Open Publication No. 2006-119519, however, since the electronic dial is provided with the click mechanism, in a case where an electronic apparatus performs moving image shooting, a click noise is recorded if the dial part is turned during moving image shooting so as to change a setting associated with the diaphragm value, the shutter speed, the ISO sensitivity, or the like.

SUMMARY OF THE INVENTION

The present invention provides a mechanism which implements both a turning operation for a rotational operation member and a touch operation for the same, by a simple construction without increasing the size of an electronic apparatus.

The present invention provides an electronic apparatus comprising a rotational operation member that can be turned, a rotary plate rigidly secured to the rotational operation member, the rotary plate being formed of a conductive material and having a plurality of detecting portions circumferentially formed thereon, a substrate disposed between the rotational operation member and the rotary plate, the substrate having a first detection electrode group formed on a surface thereof opposed to the rotational operation member and a second detection electrode group formed on a surface thereof opposed to the rotary plate, and a detection unit configured to detect a touch operation onto the rotational operation member based on an output from the first detection electrode group and detect a turning operation of the rotational operation member based on an output from the second detection electrode group.

According to the present invention, it is possible to implement both a turning operation for a rotational operation member and a touch operation for the same, by a simple construction without increasing the size of an electronic apparatus.

Further features of the present invention will become apparent from the following description of exemplary embodiments with reference to the attached drawings.

DESCRIPTION OF THE EMBODIMENTS

The present invention will now be described in detail below with reference to the accompanying drawings showing an embodiment thereof.

Figure 1A:
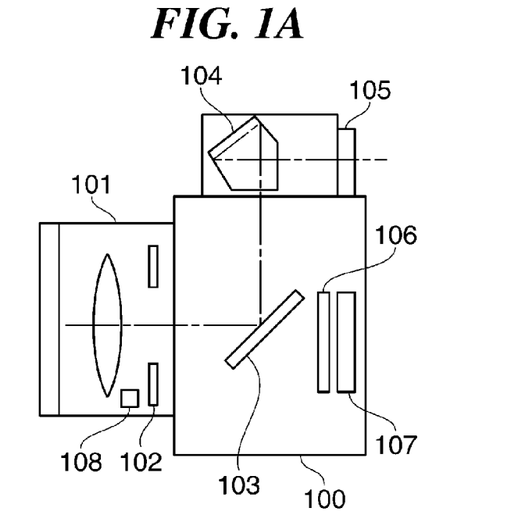
FIG. 1A is a schematic cross-sectional view, taken along an optical axis, of a digital camera implementing an electronic apparatus according to an embodiment of the present invention.
Figure 1B:
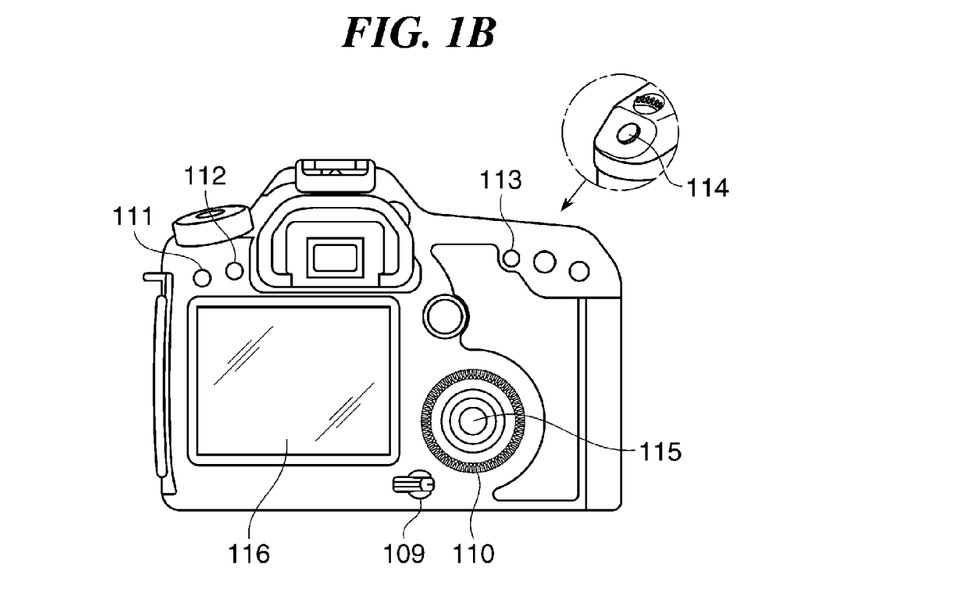
FIG. 1B is a view of the appearance of the digital camera in FIG. 1A, as viewed from the rear of the same.

FIG. 1A is a schematic cross-sectional view, taken along an optical axis, of a digital camera as an electronic apparatus according to the embodiment of the present invention, and FIG. 1B is a view of the appearance of the digital camera in FIG. 1A, as viewed from the rear of the same.

As shown in FIG. 1A, in the digital camera 100 of the present embodiment, object light having passed through a photographic lens 101 and a diaphragm 102 is reflected upward from a mirror 103 to be guided to an optical finder 105 via a pentagonal prism 104. When a release button 114 (see FIG. 1B) is fully pressed, a shooting operation is started, and the mirror 103 is retracted from an optical axis, whereby object light having passed through the photographic lens 101 and the diaphragm 102 forms an image on an image pickup device 107 via a shutter curtain 106. A gyro sensor 108 detects an amount of shake that occurs during shooting.

As shown in FIG. 1B, the digital camera 100 has a power switch 109, an electronic dial 110, a live view button 111, a moving image start button 112, an AF instruction button 113, and a determination button 115, arranged on the rear surface thereof. Further, a display section 116 implemented e.g. by a TFT, an LCD, or an organic EL is disposed on the rear surface of the digital camera 100.

Figure 2:
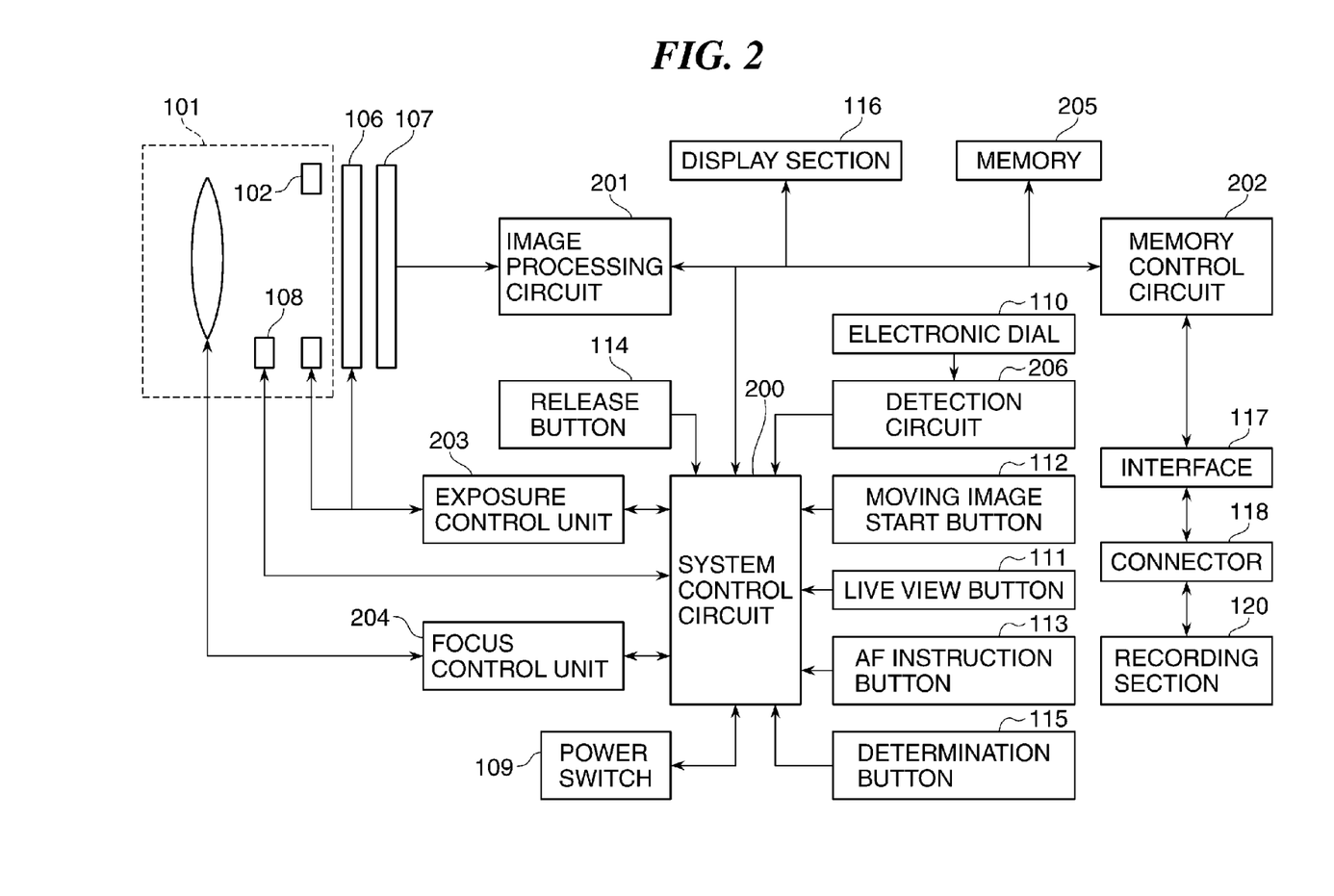
FIG. 2 is a block diagram of a control system of the digital camera.

FIG. 2 is a block diagram of a control system of the digital camera 100.

Referring to FIG. 2, an image processing circuit 201 carries out a predetermined pixel interpolation process and a predetermined color conversion process on image data output from the image pickup device 107 or image data output from a memory control circuit 202. Further, the image processing circuit 201 carries out a predetermined computation process using image data obtained by shooting, and a system control circuit 200 carries out an automatic focusing (AF) process, an automatic exposure (AE) process, and an automatic white balancing process (AWB) based on results of the predetermined computation process.

The memory control circuit 202 controls the image processing circuit 201 and a memory 205. Image data output from the image pickup device 107 is written into the memory 205 via the image processing circuit 201 and the memory control circuit 202, or only via the memory control circuit 202. The memory 205 stores still image data and moving image data obtained by shooting. An exposure control unit 203 controls the diaphragm 102 and the shutter curtain 106, and a focus control unit 204 controls a focusing operation by the photographic lens 101. The system control circuit 200 includes a CPU (central processing unit), a ROM (read only memory), and a RAM (random access memory), and controls the overall operation of the digital camera 100.

The power switch 109 is a button for giving an instruction for switching on or off the power of the digital camera 100. The electronic dial 110 is operated to set a shutter speed, a diaphragm value, an ISO sensitivity, etc., or to select an item on a menu screen displayed on the display section 116. The electronic dial 110 corresponds to an example of a rotational operation member of the present invention. The determination button 115 is pressed to determine a selection performed using the electronic dial 110.

The live view button 111 is pressed to give an instruction for starting live view shooting. The moving image start button 112 is pressed to give an instruction for starting moving image shooting in a live view shooting state of the digital camera 100. The AF instruction button 113 is pressed to give an instruction for starting an operation e.g. for the AF process, the AE process, and the AWB process.

The release button 114 is half pressed to give an instruction for starting the operation e.g. for the AF process, the AE process, and the AWB process. Further, the release button 114 is fully pressed to give an instruction for starting an exposure process for writing image data from the image pickup device 107 into the memory 205 via the memory control circuit 202 and a recording process for writing the image data in a recording section 120. An interface 117 connects between the recording section 120, such as a memory card or a hard disk, and the digital camera 100 via a connector 118.

Figure 3A:
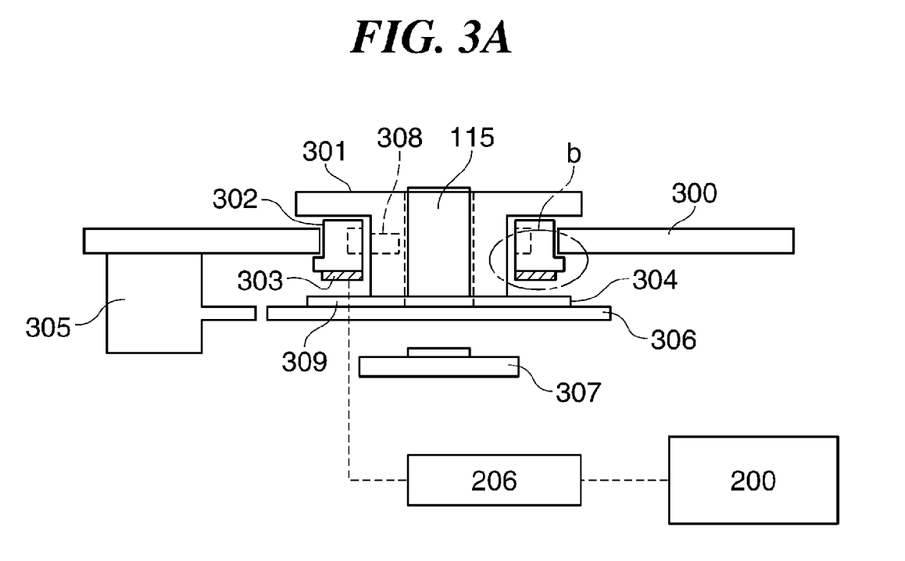
FIG. 3A is a cross-sectional view of an electronic dial, taken along an axis thereof.
Figure 3B:
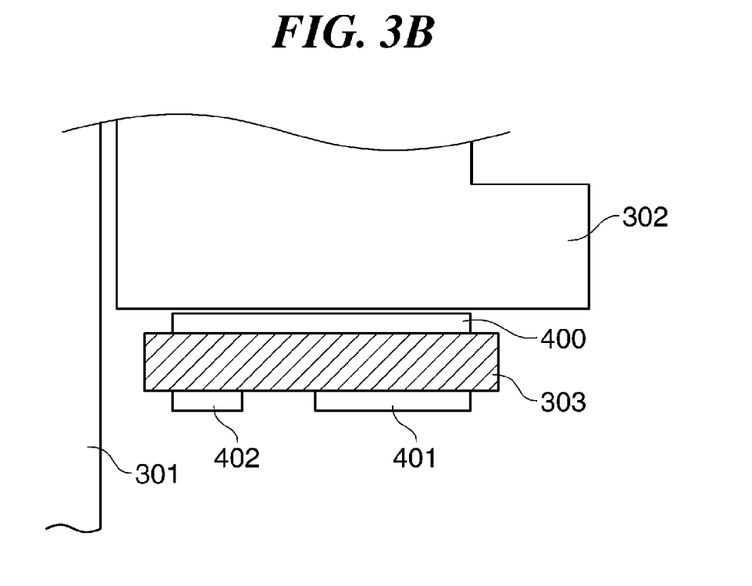
FIG. 3B is an enlarged view of a "b" portion appearing in FIG. 3A.
Figure 4:
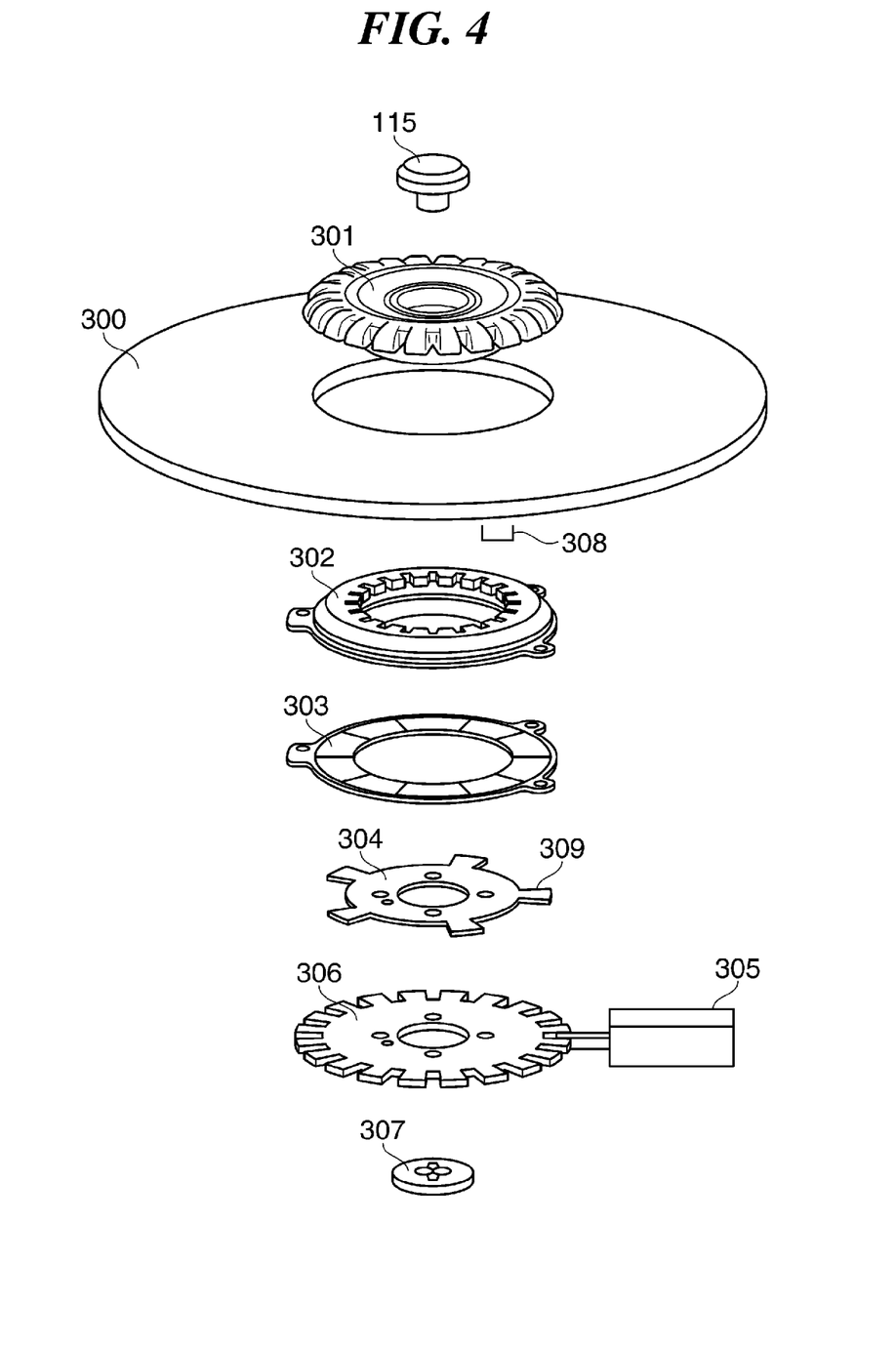
FIG. 4 is an exploded perspective view of the electronic dial.
Figure 5A:
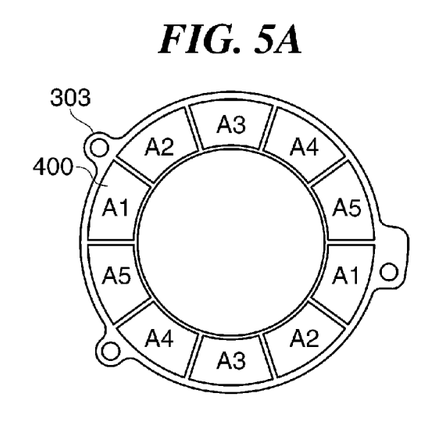
FIG. 5A is a view of a printed circuit board of the electronic dial as viewed from a detection electrode group A side.
Figure 5B:
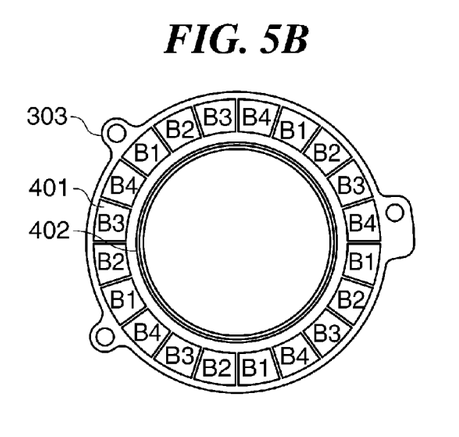
FIG. 5B is a view of the printed circuit board as viewed from a detection electrode group B side.
Figure 5C:
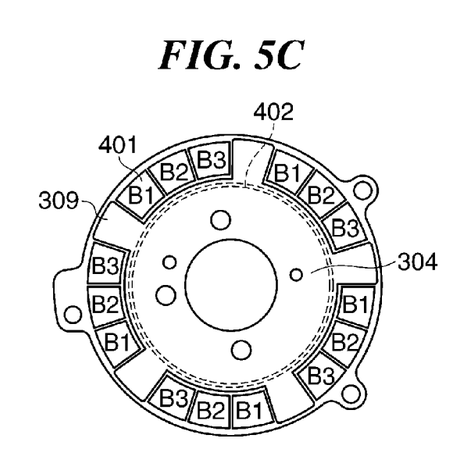
FIG. 5C is a view showing the relationship between the printed circuit board of the electronic dial and a rotary plate of the same.
Figure 5D:
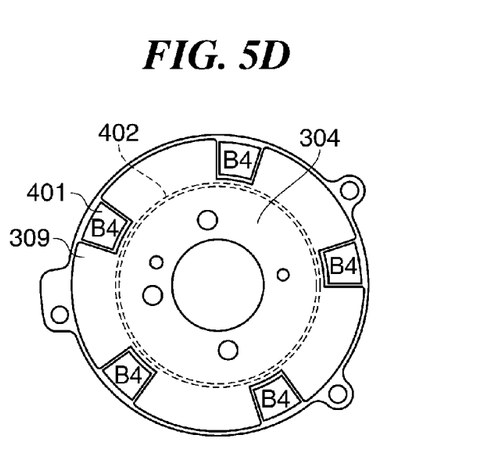
FIG. 5D is a view showing another example of the relationship between the printed circuit board and the rotary plate.

Next, the electronic dial 110 will be described with reference to FIGS. 3A, 3B to 6. FIG. 3A is a cross-sectional view of the electronic dial 110, taken along the axis thereof, FIG. 3B is an enlarged view of a "b" portion appearing in FIG. 3A, and FIG. 4 is an exploded perspective view of the electronic dial 110. FIG. 5A is a view of a printed circuit board 303 of the electronic dial 110, as viewed from the front of the electronic dial 110, and FIG. 5B is a view of the printed circuit board 303 as viewed from the rear of the same. Further, FIG. 5C is a view showing the relationship between the printed circuit board 303 of the electronic dial 110 and a rotary plate 304 of the same, and FIG. 5D is a view showing another example of the relationship between the printed circuit board 303 and the rotary plate 304.

As shown in FIGS. 3A, 3B, and 4, the electronic dial 110 comprises a rotational operation member 301, a rotation support member 302, the printed circuit board 303, the rotary plate 304, a lock switch 305, and a lock plate 306.

The rotation support member 302 is rigidly secured to an exterior cover 300, and the rotational operation member 301 is rotatably supported by the rotation support member 302. The rotational operation member 301 accommodates a click generating member 308 formed by a ball or a spring. When the rotational operation member 301 is turned, the click generating member 308 is brought into engagement with a click plate formed into a wavy shape such that it extends circumferentially along the inner periphery of the rotation support member 302, to thereby give a click feeling to a user. Further, the determination button 115 is fitted into the central part of the rotational operation member 301 such that it can be depressed. A depression of the determination button 115 is detected by a button operation detecting member 307.

The printed circuit board 303 is rigidly secured to the rear surface (lower surface as viewed in FIGS. 3A, 3B, and 4) of the rotation support member 302. As shown in FIG. 5A, on the front surface (upper surface as viewed in FIGS. 3A, 3B, and 4) of the printed circuit board 303, there is formed a detection electrode group A 400, and as shown in FIG. 5B, on the rear surface of the printed circuit board 303, there is formed a detection electrode group B 401. Each detection electrode of the detection electrode group A 400 and the detection electrode group B 401 is of an electrostatic capacity type, and a change in electrostatic capacity in each of the detection electrode group A 400 and the detection electrode group B 401 is detected by a detection circuit 206. Further, as shown in FIG. 5B, the rear surface of the printed circuit board 303 has an inner periphery thereof formed with a ground electrode 402. The ground electrode 402 is formed in a manner flush with the detection electrode group B 401.

The rotary plate 304 is rigidly secured to the rotational operation member 301 in a manner opposed to the ground electrode 402 on the rear surface of the printed circuit board 303 in a direction of the rotational axis of the rotary plate 304. The rotary plate 304 has a plurality of detecting portions 309 circumferentially formed at substantially equally-spaced intervals and extending outward from an outer periphery thereof such that they are each opposed to any detection electrode included in the detection electrode group B 401 in the direction of the rotational axis of the rotary plate 304. The lock plate 306 cooperates with the lock switch 305 to form a lock mechanism for restricting rotation of the rotational operation member 301. The lock mechanism will be described hereinafter in detail with reference to FIG. 6.

In the present embodiment, the detection electrode group A 400 is used to detect a touch operation by a user's finger on the surface of the rotational operation member 301. More specifically, when a finger approaches the surface of the rotational operation member 301, there occurs a change in electrostatic capacity of a detection electrode included in the detection electrode group A 400, and the change is detected by the detection circuit 206. Then, the system control circuit 200 determines based on a result of the detection by the detection circuit 206 that the surface of the rotational operation member 301 has been touch-operated.

On the other hand, the detection electrode group B 401 is used for detecting the turning operation of the detecting portions 309 of the rotary plate 304. The rotary plate 304 is axially opposed to the ground electrode 402 of the printed circuit board 303 and electrostatically coupled to the same. The detection electrode group B 401 is composed of detection electrodes of four types B1 to B4. For this reason, when the detection electrodes of one of the four types B1 to B4 of the detection electrode group B 401 are brought into axially facing relation to the detecting portions 309 of the rotary plate 304, they are electrostatically coupled to the ground electrode 402 of the printed circuit board 303 via the rotary plate 304.

For example, referring to FIG. 5B, when the rotary plate 304 is turned from a state where the detecting portions 309 are axially opposed to the detection electrodes B1 of the detection electrode group B 401 to a state where the detecting portions 309 are axially opposed to the detection electrodes B2 of the same, the detection circuit 206 detects changes in electrostatic capacity in the detection electrode types B1 and B2. Then, the system control circuit 200 determines, based on a detection result from the detection circuit 206, that the rotational operation member 301 is turn-operated in a direction from the detection electrode type B1 to the detection electrode type B2 (clockwise as viewed in FIG. 5B).

Note that assuming that the rotational operation member 301 and the rotation support member 302 are formed of a conductive material, when a finger approaches the rotational operation member 301 and the rotation support member 302, the entire surfaces of these become uniform in potential. For this reason, the detection circuit 206 detects that all the detection electrodes of the detection electrode group A 400 are identical in potential, which prevents detection in a change in electrostatic capacity of each detection electrode included in the detection electrode group A 400, so that the system control circuit 200 can only determine whether or not the rotational operation member 301 has been touch-operated.

To solve this problem, in the present embodiment, the rotational operation member 301 and the rotation support member 302 are formed of a non-conductive material, such as a ceramic material or a resin material, so as to detect a circumferential touch position on the rotational operation member 301 and secure the same function as that of the turning operation of the conventional electronic dial.

Next, the detection electrode group A 400 and the detection electrode group B 401 of the printed circuit board 303 and the ground electrode 402 of the same will be described in more detail with reference to FIGS. 5A to 5D.

As shown in FIG. 5A, the detection electrode group A 400 is composed of detection electrodes of five types A1 to A5. The detection electrodes of five types A1 to A5 are circumferentially sequentially arranged at equal-spaced intervals in order from A1 to A5 within a range of 180 degrees. The detection electrode group A 400 has two repeated arrangements of the detection electrodes of the five types A1 to A5 in a range of 360 degrees. Note that the detection electrodes A1 to A5 correspond to an example of first detection electrodes of the present invention.

In the present embodiment, the detection electrode group A 400 is formed as a single electrode assembly, and therefore it is possible to reduce wiring in comparison with a case where a plurality of independent electrodes are respectively formed, and reduce load applied to the system control circuit 200.

On the other hand, as shown in FIG. 5B, the detection electrode group B 401 formed on the rear surface of the printed circuit board 303 is disposed such that the detection electrodes of the four types B1 to B4 are circumferentially sequentially arranged at equal-spaced intervals in order from B1 to B4 in a range of 72 degrees. The detection electrode group B 401 has five repeated arrangements of the detection electrodes of the four types B1 to B4. Therefore, the detection electrodes of each of the types B1 to B4 are disposed at every 72 degrees. The number of the detection electrodes included in the detection electrode group B 401 is made equal to the number (twenty in the present embodiment) of clicks which should occur per one rotation of the rotational operation member 301, and with this arrangement, a turn of the rotary plate 304 is detected in association with occurrence of a click feeling given by a turning operation of the rotational operation member 301. Note that the detection electrodes B1 to B4 correspond to an example of second detection electrodes of the present invention.

In the present embodiment, the detection electrode group B 401 is formed as a single electrode assembly, and therefore it is possible to reduce wiring in comparison with a case where a plurality of independent electrodes are respectively formed, and reduce load applied to the system control circuit 200.

Further, each of the detecting portions 309 of the rotary plate 304 has substantially the same shape as one detection electrode as a component of the detection electrode group B 401. The detecting portions 309 are formed in number corresponding to the number of detection electrodes of each of the four types B1 to B4 arranged in the range of 360 degrees (i.e. five in the present embodiment), and the detecting portions 309 are disposed such they are axially opposed to the detection electrodes of one of the four types B1 to B4 (the detection electrode type B4 in FIG. 5C). Note that each of the detecting portions 309 may be disposed in a manner axially opposed to a plurality of detection electrode types. More specifically, as shown in FIG. 5D, the detecting portions 309 may be shaped such that they can be axially opposed to the detection electrode types B1, B2, and B3 out of the four detection electrode types B1 to B4.

Furthermore, in the present embodiment, since the ground electrode 402 is formed along the entire circumference of the printed circuit board 303, the entire surface of the rotary plate 304 is axially opposed to the ground electrode 402 irrespective of the rotational phase of the rotary plate 304, so that detection sensitivity can be improved.

Next, the lock mechanism will be described with reference to FIG. 6. The lock mechanism is configured to be operable in a case where a setting for inputting a turning operation by touch operation is designated by the user, to prevent an inadvertent turning operation of the rotational operation member 301 from causing the detection electrodes A 400 and B 401 to perform simultaneous detection of the operation.

Figure 6:
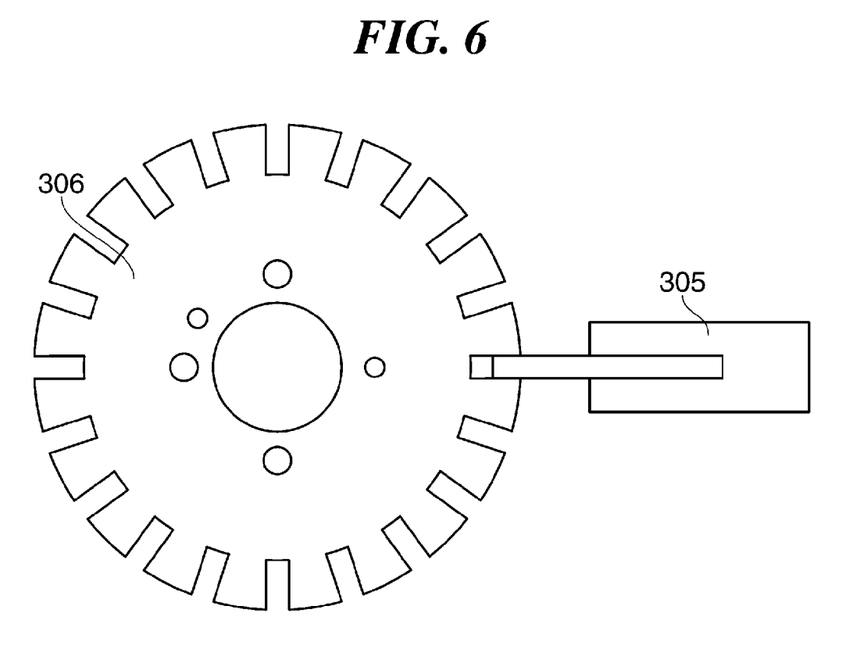
FIG. 6 is a schematic view useful in explaining a lock mechanism of the electronic dial.

As shown in FIG. 6, the lock plate 306 has an outer periphery thereof circumferentially formed with protrusions and recesses, and is rigidly secured to the rotational operation member 301 from the rear-surface side of the rotary plate 304, together with the rotary plate 304. The lock switch 305 is formed e.g. by a solenoid. When the setting for inputting a turning operation by touch operation is designated by the user, the system control circuit 200 instructs the lock switch 305 to come into engagement with a recess of the outer periphery of the lock plate 306 by projecting a plunger, to thereby restrict rotation of the rotational operation member 301. Note that the construction of the lock mechanism is not particularly limited, but the lock mechanism can have any suitable construction insofar as it can restrict rotation of the rotational operation member 301 when the setting for inputting a turning operation by touch operation is designated by the user.

Next, a description will be given of a shooting control process executed according to an operation of the electronic dial 110, with reference to FIG. 7. The shooting control process in FIG. 7 is executed e.g. by the CPU of the system control circuit 200 by loading an associated program stored e.g. in the ROM into the RAM.

Figure 7:
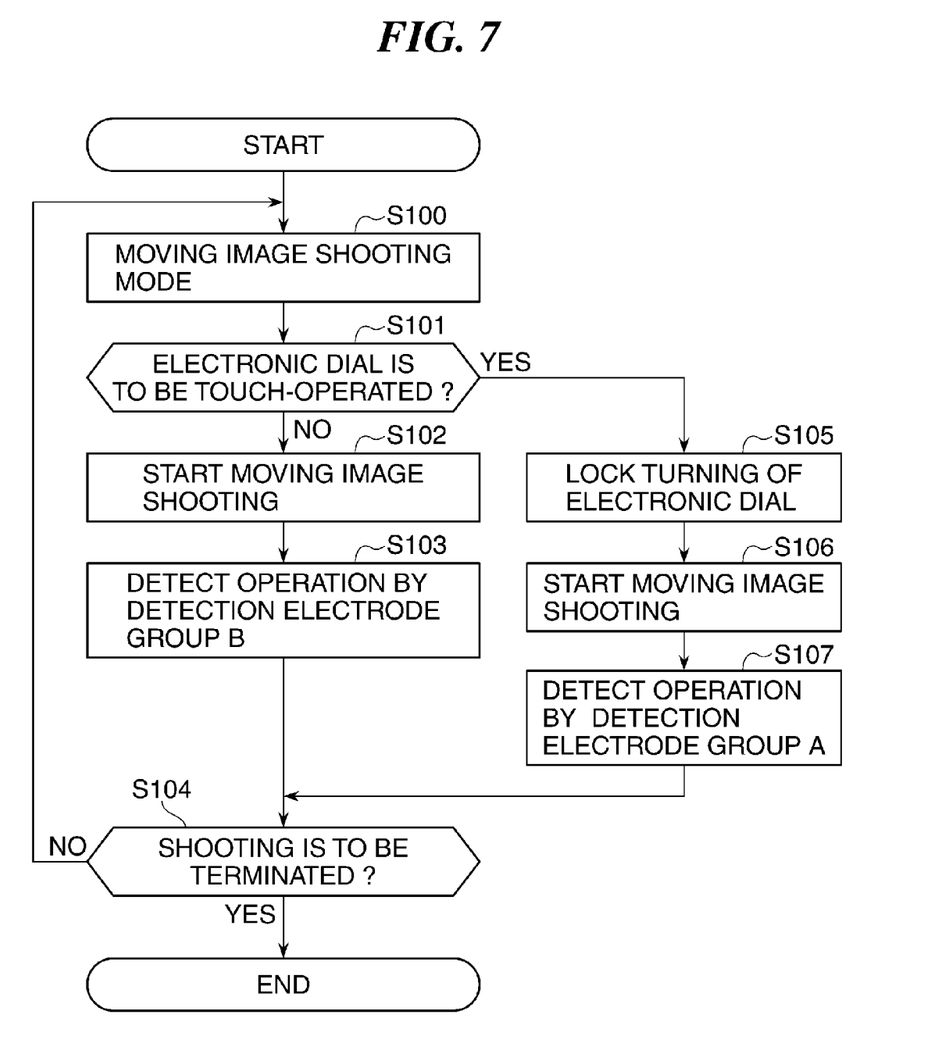
FIG. 7 is a flowchart of a shooting control process executed according to an operation of the electronic dial.

Referring to FIG. 7, when the moving image start button 112 is operated by the user, the system control circuit 200 starts a moving image shooting mode in a step S100, and the system control circuit 200 proceeds to a step S101.

In the step S101, the system control circuit 200 determines whether or not the setting of "input by touch-operating the electronic dial 110" has been selected by user operation. If the option "input by touch-operating the electronic dial 110" has been selected, the process proceeds to a step S105, whereas if not, the system control circuit 200 proceeds to a step S102. The option "input by touch-operating the electronic dial 110" may be selected by user operation from a menu screen displayed on the display section 116, or alternatively, a dedicated operation member may be provided for the selection by user operation.

In the step S102, when the release button 114 is operated, the system control circuit 200 starts moving image shooting, and then the system control circuit 200 proceeds to a step S103.

In the step S103, the system control circuit 200 causes the detection circuit 206 to detect a turning operation of the rotational operation member 301, based on a change in electrostatic capacity of each of the detection electrodes constituting the detection electrode group B 401, thereby determining that a predetermined setting associated with the turning operation has been selected, and then proceeds to a step S104.

In the step S104, the system control circuit 200 determines whether or not the power switch 109 has been turned off. If the power switch 109 has been turned off, the system control circuit 200 stops shooting operation and terminates the present process. On the other hand, if the power switch 109 has not been turned off, the process returns to the step S100, and the moving image shooting is continued in the moving image shooting mode.

On the other hand, in the step S105, the system control circuit 200 causes the lock switch 305 to project the plunger to restrict rotation of the rotational operation member 301, and then the system control circuit 200 proceeds to a step S106.

In the step S106, when the release button 114 is operated, the system control circuit 200 starts moving image shooting, and then the system control circuit 200 proceeds to a step S107.

In the step S107, the system control circuit 200 causes the detection circuit 206 to detect a touch operation onto the rotational operation member 301, based on a change in electrostatic capacity of each of the detection electrodes constituting the detection electrode group A 400, thereby determining that a predetermined setting associated with the touch operation has been selected, and then proceeds to the step S104.

As described above, according to the present embodiment, even in a case where the electronic dial 110 is provided with the click mechanism, it is possible to change respective settings associated with the diaphragm value, the shutter speed, the ISO sensitivity, and so forth, by touch-operating the rotational operation member 301 during moving image shooting, without generating a click noise. Thus, recording of click noises during moving image shooting can be prevented.

Further, in the present embodiment, the detection electrode groups A 400 and B 401 are both of an electrostatic capacity type, and a change in the electrostatic capacity in the detection electrode group A 400 and the detection electrode group B 401 is detected by the detection circuit 206. Therefore, it is possible to improve the durability of the electronic dial 110 in comparison with an electronic dial using a contact piece.

Note that the present invention is not limited to the above-described embodiment, but the material, shape, dimensions, form, number, location, etc. of each of the members can be changed without departing from the spirit and scope of the present invention.

While the present invention has been described with reference to an embodiment, it is to be understood that the invention is not limited to the disclosed embodiment. The scope of the following claims is to be accorded the broadest interpretation so as to encompass all modifications, equivalent structures and functions.

For example, although in the above-described embodiment, settings associated with the diaphragm value, the shutter speed, the ISO sensitivity, and so forth are changed by touch-operating the rotational operation member 301 during moving image shooting, the rotational operation member 301 may be touch-operated during still image shooting so as to change the settings.

This application claims priority from Japanese Patent Application No. 2010-275772 filed Dec. 10, 2010, which is hereby incorporated by reference herein in its entirety.

What is claimed is:

1. An electronic apparatus comprising:
a rotational operation member that can be turned;
a rotary plate rigidly secured to the rotational operation member, the rotary plate being formed of a conductive material and having a plurality of detecting portions circumferentially formed thereon;
a substrate disposed between the rotational operation member and the rotary plate, the substrate having a first detection electrode group formed on a surface thereof opposed to the rotational operation member and a second detection electrode group formed on a surface thereof opposed to the rotary plate; and
a detection unit configured to detect a touch operation onto the rotational operation member based on an output from the first detection electrode group and detect a turning operation of the rotational operation member based on an output from the second detection electrode group.

2. The electronic apparatus according to claim 1, wherein the first detection electrode group has a plurality of first detection electrodes circumferentially arranged thereon, and the second detection electrode has a plurality of second detection electrodes circumferentially arranged thereon, and
wherein a total number of the second detection electrodes arranged in the second detection electrode group is larger than a total number of the first detection electrodes arranged in the first detection electrode group.

3. The electronic apparatus according to claim 2, wherein the first detection electrodes and the second detection electrodes are each used for detecting a change in electrostatic capacity thereof.

4. The electronic apparatus according to claim 1, wherein the surface of the substrate axially opposed to the rotary plate has a ground electrode formed thereon along an entire circumference thereof.

5. The electronic apparatus according to claim 1, further comprising a switching unit configured to switch the electronic apparatus between a first state and a second state, and
wherein in a case where the switching unit switches the electronic apparatus to the first state, the detection unit detects the touch operation onto the rotational operation member based on the output from the first detection electrode group, and
wherein in a case where the switching unit switches the electronic apparatus to the second state, the detection unit detects the turning operation of the rotational operation member based on the output from the second detection electrode group.

6. The electronic apparatus according to claim 5, further comprising a lock unit configured to restrict the turning operation of the rotational operation member, and
wherein in a case where the switching unit switches the electronic apparatus to the first state, the lock unit restricts the turning operation of the rotational operation member.

7. An electronic apparatus comprising:
a rotational operation member that can be turned;
a lock unit configured to restrict the turning operation of the rotational operation member,
a detection unit configured to detect a first signal based on a touch operation onto the rotational operation member and detect a second signal based on a turning operation of the rotational operation member,
wherein in a case where the lock unit restricts the turning operation of the rotational operation member, the detection unit detects the first signal based on a touch operation onto the rotational operation member, and
wherein in a case where the lock unit does not restrict the turning operation of the rotational operation member, the detection unit detects the second signal based on a turning operation of the rotational operation member.

8. The electronic apparatus according to claim 7, further comprising a switching unit configured to switch the electronic apparatus between a first state and a second state,
wherein in a case where the switching unit switches the electronic apparatus to the first state, the lock unit restricts the turning operation of the rotational operation member, and
wherein in a case where the switching unit switches the electronic apparatus to the second state, the lock unit does not restrict the turning operation of the rotational operation member.

9. The electronic apparatus according to claim 7, further comprising a rotary plate rigidly secured to the rotational operation member, the rotary plate being formed of a conductive material and having a plurality of detecting portions circumferentially formed thereon;
a substrate having a first detection electrode group and a second detection electrode group,
wherein the detection unit detects a touch operation onto the rotational operation member based on an output from the first detection electrode group and detects a turning operation of the rotational operation member based on an output from the second detection electrode group.

10. The electronic apparatus according to claim 9, wherein the first detection electrode group has a plurality of first detection electrodes circumferentially arranged thereon, and the second detection electrode has a plurality of second detection electrodes circumferentially arranged thereon, and
wherein a total number of the second detection electrodes arranged in the second detection electrode group is larger than a total number of the first detection electrodes arranged in the first detection electrode group.

11. The electronic apparatus according to claim 10, wherein the first detection electrodes and the second detection electrodes are each used for detecting a change in electrostatic capacity thereof.

12. The electronic apparatus according to claim 9, wherein the surface of the substrate axially opposed to the rotary plate has a ground electrode formed thereon along an entire circumference thereof.

* * * * *